US009190180B2

(12) United States Patent
Allenou et al.

(10) Patent No.: US 9,190,180 B2
(45) Date of Patent: Nov. 17, 2015

(54) METHOD FOR PREPARING A POWDER OF AN ALLOY BASED ON URANIUM AND MOLYBDENUM

(75) Inventors: Jerome Allenou, Lille (FR); Meryl Brothier, Aix en Provence (FR); Francois Charollais, Villelaure (FR); Xaviere Iltis, Pierrevert (FR); Olivier Tougait, Rennes (FR); Mathieu Pasturel, Montreuil sur Ille (FR); Henri Noel, Thorigne Fouillard (FR)

(73) Assignees: COMMISSARIAT A L'ENERGIE ATOMIQUE ET AUX ENERGIES ALTERNATIVES, Paris (FR); UNIVERSITE DE RENNES I, Rennes (FR)

( * ) Notice: Subject to any disclaimer, the term of this patent is extended or adjusted under 35 U.S.C. 154(b) by 221 days.

(21) Appl. No.: 13/977,259

(22) PCT Filed: Dec. 23, 2011

(86) PCT No.: PCT/EP2011/074009
§ 371 (c)(1),
(2), (4) Date: Aug. 30, 2013

(87) PCT Pub. No.: WO2012/089687
PCT Pub. Date: Jul. 5, 2012

(65) Prior Publication Data
US 2013/0333519 A1 Dec. 19, 2013

(30) Foreign Application Priority Data

Dec. 28, 2010 (FR) ...................................... 10 61320

(51) Int. Cl.
B22F 9/20 (2006.01)
G21C 3/60 (2006.01)
G21C 21/02 (2006.01)
C22C 1/04 (2006.01)
C22C 28/00 (2006.01)
C22C 43/00 (2006.01)

(52) U.S. Cl.
CPC . *G21C 21/02* (2013.01); *B22F 9/20* (2013.01); *C22C 1/04* (2013.01); *C22C 28/00* (2013.01); *C22C 43/00* (2013.01); *G21C 3/60* (2013.01); *B22F 2999/00* (2013.01); *Y02E 30/35* (2013.01); *Y02E 30/38* (2013.01)

(58) Field of Classification Search
None
See application file for complete search history.

(56) References Cited

U.S. PATENT DOCUMENTS

| 3,102,848 A | * | 9/1963 | Merlub-Sobel | 252/640 |
| 3,109,730 A | | 11/1963 | Zegler | |
| 3,778,380 A | * | 12/1973 | Baker et al. | 252/640 |
| 4,584,184 A | | 4/1986 | Nalewajek et al. | |
| 5,978,432 A | * | 11/1999 | Kim et al. | 376/261 |
| 2013/0336833 A1 | | 12/2013 | Allenou et al. | |

FOREIGN PATENT DOCUMENTS

| DE | 1433120 A1 | 5/1969 |
| FR | 2777688 A1 | 10/1999 |
| FR | 2889351 A1 | 2/2007 |
| GB | 2330448 A | 4/1999 |
| GB | 2354256 A | 3/2001 |
| JP | 55-54508 A | 4/1980 |
| JP | 6-258477 A | 9/1994 |

OTHER PUBLICATIONS

Chen, M., et al., "Characterization of gamma-U-10 wt.percentMo alloy powders obtained by hydride-milling-dehydride process", "Journal of Nuclear Materials", May 1, 2010, pp. 69-72, vol. 400, No. 1.
Lee, J., et al., "Study of decomposition and reactions with aluminum matrix of dispersed atomized U-10 wtpercent Mo alloy", "Journal of Nuclear Materials", Dec. 2002, pp. 147-152, vol. 305.
Park, J., et al., "Neutron diffraction analyses of U-(6-10 wt.percent)Mo alloy powders fabricated by centrifugal atomization", "Journal of Nuclear Materials", Feb. 2010, pp. 27-30, vol. 397.

* cited by examiner

*Primary Examiner* — George Wyszomierski
(74) *Attorney, Agent, or Firm* — Hultquist, PLLC; Mary B. Grant

(57) ABSTRACT

A method for preparing a powder of an alloy based on uranium and molybdenum in a metastable γ phase is provided, which comprises:
a) putting at least one first reagent selected from uranium oxides and mixtures thereof, uranium fluorides and mixtures thereof, into contact with a second reagent consisting in molybdenum and a third reagent consisting in a reducing metal, the first, second and third reagents being in a divided form;
b) reacting the reagents at a temperature≥the melting temperature of the third reagent and under an inert atmosphere, whereby this reaction leads to the formation of the alloy comprising uranium and molybdenum in the form of a powder, for which the particles are covered with a reducing metal oxide or fluoride layer;
c) cooling the so formed powder at a rate at least equal to 450° C./hour; and
d) removing the reducing metal oxide or fluoride layer which covers the particles of the powder of the alloy comprising uranium and molybdenum.

28 Claims, No Drawings

METHOD FOR PREPARING A POWDER OF AN ALLOY BASED ON URANIUM AND MOLYBDENUM

CROSS-REFERENCE TO RELATED APPLICATIONS

This application is a U.S. national phase under the provisions of 35 U.S.C. §371 of International Patent Application No. PCT/EP11/74009 filed Dec. 23, 2011, which in turn claims priority of French Patent Application No. 1061320 filed Dec. 28, 2010. The disclosures of such international patent application and French priority patent application are hereby incorporated herein by reference in their respective entireties, for all purposes.

TECHNICAL FIELD

The present invention relates to a method for preparing a powder of an alloy based on uranium and molybdenum in a metastable γ phase and, in particular of a binary alloy UMo or of a ternary alloy UMoX wherein X represents a metal other than uranium and molybdenum.

It also relates to a method for manufacturing a nuclear fuel implementing this method.

Such an alloy powder is actually able to enter the manufacturing of nuclear fuels and, notably fuels for experimental nuclear reactors, more known under the letters MTR (« Material Testing Reactor» ), such as the Jules Horowitz Reactor (JHR) of the CEA in Cadarache, the High Flux Reactor (HFR) of the Laue-Langevin Institute or further the high neutron flux reactor BR-2 of the site of Mol in Belgium.

PRIOR ART

Up to the 1950ies, fuels dedicated to MTRs essentially consisted of alloys of uranium and aluminium having a uranium 235 mass content of 93% for a specific load of 1.2 g or uranium per $cm^3$.

From 1977 and driven by the United States of America, a program aiming at reducing the risks of proliferation of nuclear weapons and, therefore at lowering the uranium enrichment level of the fuels dedicated to MTRs was set into place on an international level. This is the RERTR (« Reduced Enrichment for Research and Test Reactor» ) program.

Consequently, the development of new uranium alloys which are capable of being used as nuclear fuels in MTRs while having a uranium 235 mass content not exceeding 20%, gave rise to many studies.

Thus, alloys based on uranium and silicon and alloys based on uranium and molybdenum were notably studied. The latter type of alloy is the one which has the most interesting properties since it gives notably the possibility of attaining a specific load of 8.5 g of uranium per $cm^3$ of a fuel core while this load is only at best of 4.8 g of uranium per $cm^3$ for uranium silicides.

For preparing powders of alloys of uranium and of molybdenum in a metastable γ phase, a certain number of methods were proposed to this day which may be grouped into three great types.

The methods of the first type are said to be by « fusion-atomization» and consist of melting uranium metal and molybdenum at a temperature above 1150° C. in a refractory crucible, which is located in a vacuum chamber, and then of pouring the molten mass on a rotating disc which the chamber includes while a coolant gas (argon or helium) is simultaneously introduced into this chamber.

Under the effect of the centrifugal force of the rotating disc, the molten mass is projected in the form of droplets on the walls of the chamber. These droplets are immediately solidified by the coolant gas into a metastable γ phase, this γ phase being, from the three allotropic phases of uranium (i.e. α, β and γ), the one which behaves satisfactorily under irradiation with notably good capability for solubilizing fission gases.

These methods, which are notably described in French patent application No. 2 777 688 [1], U.S. Pat. No. 5,978,432 [2] and Japanese patent application No. 55-054508 [3], do not allow control of the shape of the particles of the powders obtained nor of the intraparticulate porosity of these powders. Thus, the particles are mandatorily spherical or quasi-spherical (i.e. the ratio between their maximum dimension ($D_{max}$) and their minimum dimension ($D_{min}$) is less than 1.1), while the intraparticulate porosity is itself inexistent.

Now, it is not desirable that the particles of alloy powders be spherical or quasi-spherical since this may induce segregation of fissile particles during rolling to which are subject the fuel elements during their manufacturing, just as it is not desirable that these particles be without any porosity, such a porosity actually giving the possibility of ensuring the presence in the fuel of buffer reservoirs for fission gases and of accordingly delaying the swelling of this fuel in an irradiation situation.

Furthermore, the particles of the alloy powders obtained by these methods consist of grains for which the molybdenum content differs from the center to the periphery of these grains.

The methods of the second type are said to be by « mechanical fusion fragmentation» and consist of forming from uranium metal and molybdenum, ingots of a UMo alloy by fusion/solidification in order to set this alloy in a metastable γ phase and then of transforming these ingots into a powder either by milling them (for example, by cryogenic milling) or by machining them in the form of shavings which are then milled.

These methods do not give the possibility of controlling or ensuring the reproducibility of a certain number of characteristics exhibited by the particles of the alloy powders obtained, and in particular the shape, the size and the intraparticulate porosity of the particles.

Moreover, the particles of these powders consist of grains having a microstructure with a strong work-hardening rate, which is therefore a priori unstable and which may strongly evolve in an irradiation situation.

Finally, the mechanical fragmentation of a solidified metal alloy is an operation which is difficult to apply on an industrial scale and this, all the more since it induces increased reactivity of the alloy with risks of oxidation and/or of pollution of this alloy by the equipment used for achieving this fragmentation (milling balls for example).

This second type of method is moreover generally recognized as not having any industrial future.

The methods of the third type are said to be by « chemical fusion-fragmentation» and are distinguished from the methods of the second type in that the reduction to the state of powders of uranium and molybdenum alloy ingots is achieved by a chemical treatment and not by a mechanical treatment.

This chemical treatment, which has notably been described by Chen et al. in *Journal of Nuclear Materials*, 400(1), 69-72, 2010 [4], first of all consists of removing the oxide surface layer which covers the ingots, of heating the ingots to a temperature of 500 to 650° C. in order to decompose the metastable γ phase into an α phase, and then of subjecting these ingots to several cycles each comprising a hydridation step followed by a dehydration step before milling them in an argon atmosphere. At the end of this milling, the particles with a too large size are removed by sorting, and a homogenization heat treatment is then carried out, at a temperature above 900° C., in order to re-stabilize the metastable γ phase alloy powder.

There also, these methods do not give the possibility of controlling and ensuring reproducibility of the shape, of the size and of the intraparticulate porosity of the particles of the obtained powders. These methods are more restrictive as regards safety because of the use of hydrogen for the hydridation steps. Further they have the drawback of comprising a significant number of steps and of requiring operation in an atmosphere totally purged of oxygen.

Considering the foregoing, the inventors therefore set the goal of providing a method which allows preparation of a powder of an alloy based on uranium and molybdenum in a metastable γ phase and which, generally, is without any of the various drawbacks exhibited by the methods proposed today for preparing such a powder.

More particularly, the inventors set the goal of providing a method which gives the possibility of obtaining in a reproducible way a powder of an alloy based on uranium and molybdenum in a metastable γ phase, the particles of which having characteristics, notably of shape, size and intraparticulate porosity and homogeneity in the distribution of molybdenum, capable of facilitating the manufacture of nuclear fuels from this powder and of optimizing the behavior of these fuels in an irradiation situation and, in particular, their capability of retaining fission gases.

They also set the goal that this method should meet specific constraints in the application of fissile materials and notably limit at best the risk of criticality as well as the production of liquid effluents contaminated with fissile materials and therefore requiring reprocessing.

Further they set the goal that this method, while having the aforementioned advantages, be relatively simple to apply and have a cost compatible with utilization on an industrial scale.

SUMMARY OF THE INVENTION

These objects and further other ones are achieved by the present invention which proposes a method for preparing a powder of an alloy comprising uranium and molybdenum in a metastable γ phase, which method comprises:

a) putting at least one first reagent selected from uranium oxides and mixtures thereof, uranium fluorides and mixtures thereof, into contact with a second reagent consisting in molybdenum and a third reagent consisting in a reducing metal, the first, second and third reagents being in a divided form;

b) reacting the so contacted reagents at a temperature at least equal to the melting temperature of the third reagent and in an inert atmosphere, whereby this reaction leads to the formation of the alloy comprising uranium and molybdenum in the form of a powder, the particles of which are covered with a layer of the reducing metal oxide or fluoride;

c) cooling the so formed powder at a rate at least equal to 450° C./hour; and d) removing the oxide or fluoride layer of the reducing metal which covers the particles of the powder of the alloy comprising uranium and molybdenum.

According to the invention, the first reagent is preferably an uranium oxide in which the oxidation number of the uranium ranges from 4 to 6, i.e. a uranium dioxide ($UO_2$), a uranium trioxide ($UO_3$), a uranium sesquioxide ($U_3O_8$), a uranium tetraoxide ($U_4O_9$), or a mixture thereof, which are used in the form of a powder.

However this may also be a uranium fluoride such as a uranium tetrafluoride or a mixture of uranium fluorides, also being in the form of a powder.

Being aware that the dimensions of the particles of the first reagent have an impact on the grain size of the alloy powder which is formed in step b) and that it is preferred that the particles of this alloy powder have dimensions (as determined by laser diffraction) ranging from 20 to 100 μm, a uranium oxide powder is preferably used, the particles of which have dimensions (as determined by laser diffraction) ranging from 1 to 100 μm and, even better, from 5 to 50 μm.

To do this, the uranium oxide powder may be subject, prior to its use, to one or several siftings allowing removal of particles with too small or too large dimensions.

Moreover, the uranium oxide powder may also be subject, prior to its use, to a treatment of the ovening type, intended for clearing it of possible chemical species (water, oxyhydrates, . . . ) which may be found at the surface of the particles of this powder and/or to a heat treatment such as a treatment at a temperature of 600 to 1,000° C., in a reducing atmosphere such as an atmosphere consisting of a mixture of argon and hydrogen, in order to bring back the oxygen content of this powder to stoichiometry with respect to uranium.

More preferably, the first reagent is a uranium dioxide powder for which the uranium 235 content preferably represents from 1 to 20 atomic % of the total uranium content of this powder, and which has optionally been treated so that its stoichiometric ratio U/O is equal to 2 or substantially equal to 2.

The second reagent, i.e. the molybdenum, is also preferably used in the form of a powder.

There again, insofar that the dimensions of the particles of this powder have an impact on the grain size of the alloy powder which is formed in step b), the molybdenum powder is preferably composed of particles for which the dimensions (as determined by laser diffraction) are at most equal to 250 μm and, even better, range from 5 to 150 μm.

As for the third reagent, i.e. the reducing metal, it is advantageously selected from alkaline metals (lithium, sodium, potassium, rubidium, cesium and francium) and earth alkaline metals (beryllium, calcium, magnesium, strontium, barium and radium).

More specifically, it is preferred that the third reagent be an earth alkaline metal and notably magnesium or calcium, which is either used in the form of a powder or in the form of shavings or turnings.

According to the invention, step a) may be achieved by proceeding with simple mixing of the first, second and third reagents and by then introducing this mixture into the reaction enclosure in which it is intended to carry out step b). In which case, the mixing of the three reagents is preferably carried out in a mixer of powders of the Turbula™ type, allowing intimate mixing of the powders of different densities and grain sizes without inducing agglomeration of the particles forming these powders and, thus, a modification of their grain size.

Alternatively, step a) may also be carried out by depositing in the reaction enclosure at least one layer of pellets consisting of a homogeneous mixture of reagents (which will have been prepared beforehand, for example by mixing both of these reagents in a powder mixer of the Turbula™ type, and then by subjecting the resulting mixture to uniaxial compression and at least two layers of the third reagent, the layer of pellets being inserted between both layers of the third reagent.

In every case, the first, the second and third reagents are preferably put into contact in proportions giving the possibility of obtaining at the end of step b) a powder of an alloy having a molybdenum content in accordance with the desired one but in which there is no longer any uranium present in the form of an oxide or fluoride.

Thus, for example in the case when the first reagent is uranium dioxide while the third reagent is magnesium, the reaction which takes place in step b) may be written according to the following simplified scheme:

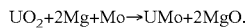

$$UO_2 + 2Mg + Mo \rightarrow UMo + 2MgO.$$

In order to obtain a powder of an alloy having a 10% molybdenum mass content, 1.22 g of uranium dioxide and 0.12 g of molybdenum will therefore be used and an amount of magnesium at least equivalent to the theoretical amount of magnesium which is required for reducing the totality of the uranium dioxide (i.e. in the case of the reaction mentioned above, 2 moles of magnesium for 1 mole of uranium dioxide).

In order to provide a safety margin and to ensure a total reduction of the uranium dioxide, it is possible to use a corresponding excess of magnesium at most of twice the theoretical amounts of required magnesium. In the previous example, the mass of magnesium which may be used is then 0.4391 g of magnesium.

According to the invention, step b) is preferably carried out in a molybdenum reaction enclosure in order to avoid contamination of the alloy powder which is desirably prepared, by elements, notably metal elements, from the material of this enclosure.

As indicated earlier, step b) is carried out at a temperature equal to or greater than the melting temperature of the third reagent, which means that this temperature will for example be of at least 650° C. if the third reagent is magnesium and of at least 842° C. if the third reagent is calcium.

In fact, within the scope of the invention, it is preferred that step b) be carried out at a temperature equal to or greater than 900° C. while being less than the melting temperature of the alloy comprising uranium and molybdenum.

Typically, the temperature used in step b) is comprised between 950 and 1,150° C., an ideal temperature for example being 1,100° C.

Moreover, it is preferred that this temperature be attained gradually. Also, step b) comprises a rise in temperature, advantageously from 50 to 200° C./hour.

It is further preferred that step b) be carried out under a pressure of at most 1 bar of an inert gas or of a mixture of inert gases such as for example argon or a mixture of nitrogen and argon.

The duration of step b) depends on the temperature used in this step and on the rate at which this temperature is attained. Thus, for example, with an equivalent temperature rise time, 48 hours are required for a reaction carried out at 950° C. while 24 hours are sufficient for a reaction carried out at 1,100° C.

As indicated earlier, step c) which is intended to set the alloy comprising uranium and molybdenum in a metastable γ phase, is carried out by using a cooling rate equal to or greater than 450° C./hour.

To do this, the reaction enclosure is preferably cooled by immersion in a heat transfer fluid, for example in a water bath or in an oil bath of the silicon oil type, maintained at room temperature or at a temperature below the latter.

According to the invention, step d) may be carried out in different ways.

Thus, it is notably possible to remove the layer which covers the particles of the alloy powder which was formed in step b) (as well as the excess of reducing metal if the latter was used in excess) by dissolution of this layer, for example by treating this alloy powder with an acid aqueous phase such as a solution of hydrochloric acid or with an organic phase comprising one or several solvents including hydrogenated groups.

However, insofar that this way of proceeding, if it is implemented on an industrial scale, may, not only pose problems in terms of managing the risk of criticality but also generating the production of significant volumes of liquid effluents requiring reprocessing, step d) is preferably carried out by milling in a fluidized bed, particles of the alloy powder obtained at the end of step c).

Such milling actually gives the possibility of both ensuring detachment of the layer which covers the alloy particles, fractionation of this layer into fine particles by attrition and separation by elutriation of the thereby generated fine particles from the alloy particles (said fine particles being actually less dense by a factor of 3 to 4, or even more, than the alloy particles) and this without using any liquid phase.

According to the invention, the milling in a fluidized bed is preferentially, notably in the case when the layer which covers the particles of the alloy powder is an oxide layer, reactive milling, it is carried out jointly with a chemical reaction.

In which case, a gas capable of reacting with the layer which covers the particles and of thereby promoting the swelling of this layer, its detachment from the underlying alloy and its attrition, is used as a fluidization gas.

Advantageously, this chemical reaction is a carbonation reaction which is carried out at a temperature preferentially ranging from 150 to 475° C. and using as a fluidization gas, carbon dioxide gas or a mixture of carbon dioxide gas and an inert gas and/or steam, the presence of steam actually allowing acceleration of the carbonation reaction.

However, as steam may generate, by condensing, a risk of criticality, it is preferable that this steam not represent more than 10% by volume of the fluidization gas. Typically, the steam content of the fluidization gas ranges from 0.03% to 5% by volume.

The fluidization gas is preferably used at a pressure equal to or greater than 1 bar and even better, at a pressure of about 10 bars, the use of such a pressure actually allowing acceleration of the chemical reaction between this gas and the layer which covers the particles of the alloy powder, and the separation of this layer from the underlying allow.

Moreover, the fluidization gas is preferably used at a so-called surface velocity which should give the possibility of exceeding the so-called free fall end velocity of the fine particles to be removed without attaining the so-called free fall end rate of alloy particles. The free fall end velocity of a given particle corresponds to the maximum velocity of the fluidization gas which allows this particle to be maintained in sustentation, (i.e. in equilibrium) at a set vertical height in the case of an ascending vertical flow of the particles. This velocity depends on the size of the particle, on its density and on its morphology.

Within the scope of the invention, such a surface velocity is typically from 3 to 20 cm/s.

In order to promote decohesion and detachment of the layer which covers the particles of the alloy powder, it is possible to resort to vibrations within the fluidized bed, for example by fitting out the reactor in which this fluidized bed is implemented, with vibrating rods or wave guides.

Actually, by definition, the fluidized bed macroscopically behaves like a fluid, the milling of the particles of the alloy powder will not be perturbed by the presence of devices generating vibrations in this bed and may even thus benefit from the supply of an additional source of energy capable of allowing embrittlement of this layer which covers the particles of the alloy powder without however modifying the characteristics of these particles.

Moreover, in order to promote decohesion and detachment of the layer which covers the particles of the alloy powder, it is also possible to subject the fluidized bed to thermal shocks, for example by supplying this bed with a fluidization gas according to a succession of cycles each comprising a first period during which the fluidization gas is at a temperature from 250 to 400° C. followed by a second period with a shorter duration than that of the first period, during which the fluidization gas is at a 100° C. lower temperature than the temperature which this gas has during the first period. This is made very relevant by the fact that, commonly, fluidized beds are considered as excellent gas/solid heat exchangers.

According to the invention, the fluidized bed is advantageously a jet bed. Indeed, this type of fluidized bed is particularly well suited to fluidization of powders with strong apparent density, difficult to fluidize and further allows optimization of the detachment, attrition and separation phenomena by elutriation of the layer which covers the particles of the alloy powder.

It should be noted that the milling in a fluidized bed corresponds to a relatively mild milling method and therefore gives the possibility, while removing very efficiently the layer which covers the particles of the alloy powder, of globally preserving the morphology and the grain size of these particles.

According to the invention, the powder of the alloy based on uranium and comprising molybdenum is preferably:
a powder of a binary alloy UMo, i.e. an alloy only consisting of uranium and molybdenum, in which case the molybdenum preferentially represents from 5 to 15% by mass and even better, from 7 to 10% by mass of this alloy; or
a powder of a ternary alloy UMoX wherein X represents a metal different from uranium and molybdenum, capable of further improving the behavior of nuclear fuels under irradiation, in which case the molybdenum preferentially represents from 5 to 15% by mass and, even better, from 7 to 10% by mass of this alloy while X, which may notably be titanium, zirconium, chromium, silicon, niobium, platinum, tin, bismuth, ruthenium or palladium, typically represents at most 6% by mass of the alloy and even better at most 4% by mass of said alloy.

In order to produce a powder of a ternary alloy UMoX by the method according to the invention, it is sufficient to add the metal X in divided form to the reagents used in step a), this addition may notably be accomplished by using the metal X in a form in which it is already alloyed with the molybdenum.

The method according to the invention has many advantages.

Indeed, firstly, it leads to obtaining alloy powders which are characterized by particles:
in which the alloy is 100% in a cubic centered phase, i.e. in a metastable phase γ with a lattice parameter of 3.417 Å;
for which the dimensions (as determined by laser diffraction) range from 20 to 100 μm;
which have an elongation index or parameter (i.e. a ratio of the maximum Féret diameter to the minimum Féret diameter as determined from electron or optical microscopy images according to the methodology described by C. Souchier in «Analyse d'images», (Image Analysis), in Techniques de l'Ingénieur, Traité Analyse Chimique et Caractérisation, P 855, 1-18, 1998 [5]) which is comprised between 1.1 and 2; and which have a close porosity value (as determined from scanning electron microscopy images, on polished cuts, according to the ASTM E1245-03 standard) which is non-zero, which represents at most 5% (v/v) of the particles and which consists of pores for which the size (i.e. the equivalent diameter as determined from electron or optical microscopy images as described in the aforementioned reference [5]) is at most equal to 3 μm.

Moreover, analysis by scanning electron microscopy coupled with analysis by energy dispersion spectrometry show that the molybdenum is homogeneously distributed in the grains forming these particles since the variations of the molybdenum content within a same grain are at most of 1% by mass.

The result of this is that these alloy powders have characteristics capable of facilitating the manufacturing of nuclear fuels from these powders and the optimization of the behavior of these fuels in a situation of irradiation and, in particular, of their capability of retaining the fission gases.

Further, this method:
gives the possibility of using as precursors of the uranium entering the composition of the alloy, powders of uranium oxides or uranium fluorides which are powders conventionally manufactured in the nuclear fuel industry and therefore for adding value to these powders;
gives the possibility of carrying out step b), which leads to the formation of the alloy powder, at a temperature of less than the melting temperature of this alloy, with which it is possible to preserve the characteristics, notably of shape, of dimensions and of intraparticulate porosity, of the obtained powder;
gives the possibility of carrying out step d), which aims at removing the layer of reducing metal oxide or fluoride which covers the particles of the alloy powder, at a temperature of less than 500° C., with which it is possible to preserve the metastable γ phase in which the alloy is found and this, without substantially modifying the morphology and the grain size of the particles of the alloy powder as obtained at the end of step b);
gives the possibility of at best limiting the risk of criticality, notably by allowing step d) to be carried out without using any aqueous or organic liquid phase; and
gives the possibility of not producing any liquid effluents contaminated with fissile materials.

The method according to the invention is therefore particularly suited to the preparation of powders of alloys based on uranium and molybdenum which are intended to enter the manufacturing of nuclear fuels and in particular of fuels intended for MTRs.

Consequently, an object of the invention is also a method for manufacturing a nuclear fuel which comprises the implementation of a method for preparing a powder of an alloy comprising uranium and molybdenum in a metastable γ phase as defined earlier.

Typically, within the scope of this manufacturing and as this is well known in the state of the art, the powder of the alloy comprising uranium and molybdenum in a metastable γ phase is mixed with a powder of aluminum or of an alloy based on aluminum in order to form the fuel core and this mixture is then subject to rolling which gives the possibility of both putting it in the form of plates and of cladding it.

Other characteristics and advantages of the invention will become apparent from the additional description which follows, and which relates to examples for implementing the method according to the invention for preparing powders of a binary alloy UMo and of a ternary ally UMoTi.

It is obvious that these examples are only given as illustrations of the object of the invention and by no means form a limitation of this object.

DETAILED SUMMARY OF PARTICULAR EMBODIMENTS

Example 1

Preparation of a Powder of a Binary Alloy UMo 100 g of a powder of a binary alloy UMo with 10% by mass of molybdenum are prepared in the following way.

First of all, pellets measuring 12 mm in diameter over a 2 mm thick homogeneous mixture U/Mo are manufactured.

To do this, 102.1 g of a mixture of a $UO_2$ powder (U/O~2), the particles of which have dimensions (as determined by laser diffraction) ranging from 1 to 50 μm, are mixed with 10 g of a molybdenum powder, the particles of which (as measured by laser diffraction) have dimensions ranging from 1 to 150 micrometers, in a Turbula™ mixer for 20 minutes and at a rate of 45 cycles/minute and this mixture is then subject to uniaxial compression by applying a stress of 100 MPa.

After which, layers of $UO_2$/Mo pellets and layers of magnesium shavings, the largest dimension of which ranges from 1 to 3 mm, are deposited in a molybdenum crucible, so as to form a stack in which each layer of $UO_2$/Mo pellets is inserted between two layers of magnesium shavings. The amount of magnesium thereby introduced into the crucible is of about 37 g.

This crucible is sealably closed under a slight pressure, of less than 1 bar, of argon. And then it is placed in an oven which is heated at a rate of 150° C./hour in order to attain a temperature of 1,100° C. The crucible is then left in the oven at this temperature so that the dwelling time of the crucible in the oven is a total of 24 hours.

At the end of this treatment, the crucible is cooled down at a rate of 1,000° C./hour by immersing it in a water bath maintained at room temperature.

The powder contained in the crucible is recovered and is subject to reactive milling in a milling machine with a jet fluidized bed by using a mixture of $CO_2$ and of steam (98/2 v/v) as a fluidization gas, a reaction temperature of 450° C. and a pressure of 5 bars. The velocity of the $CO_2$/steam gas mixture at the outlet of the milling machine is of 12 cm/second.

100 g of a powder of a UMo alloy with 10% by mass of molybdenum are thereby obtained and the particles of which are totally purged of magnesium and of magnesium oxide.

Example 2

Preparation of a Powder of a Ternary Alloy UMoTi 100 g of a powder of a ternary alloy UMoTi with 9% by mass of molybdenum and 1% by mass of titanium are prepared by following the same operating procedure as the one described in Example 1 hereinbefore, except that 9 g of molybdenum, 1 g of titanium are used, the magnesium being used in excess (about 37 g).

CITED REFERENCES

[1] FR 2 777 688
[2] U.S. Pat. No. 5,978,432
[3] JP 55-054508
[4] Chen et al., *Journal of Nuclear Materials*, 400(1), 69-72, 2010
[5] C. Souchier, «*Analyse d'images*», in *Techniques de l'Ingénieur, Traité Analyse Chimique et Caractérisation*, P 855, 1-18, 1998

The invention claimed is:

1. A method for preparing a powder of an alloy based on uranium and comprising molybdenum, in a metastable γ phase, which method comprises:
   a) putting at least one first reagent selected from uranium oxides and mixtures thereof, uranium fluorides and mixtures thereof, into contact with a second reagent consisting of molybdenum and a third reagent consisting of a reducing metal, the first, second and third reagents being in a divided form;
   b) reacting the first, second and third reagents at a temperature at least equal to a melting temperature of the third reagent and under an inert atmosphere, whereby particles are obtained, the particles comprising a core made of the alloy based on uranium and comprising molybdenum and a layer of a reducing metal oxide or fluoride covering the core;
   c) cooling the so obtained particles at a rate at least equal to 450° C./hour; and
   d) removing the reducing metal oxide or fluoride layer from the so cooled particles and thereby obtaining the powder of the alloy based on uranium and comprising molybdenum.

2. The method of claim 1, wherein the first reagent is a powder of a uranium oxide selected from uranium dioxide, uranium trioxide, uranium sesquioxide, uranium tetraoxide and mixtures thereof.

3. The method of claim 2, wherein the uranium oxide powder is composed of particles having dimensions from 1 μm to 100 μm.

4. The method of claim 2, wherein the uranium oxide powder is a powder of a uranium dioxide having a stoichiometric ratio O/U equal to 2 or substantially equal to 2.

5. The method of claim 1, wherein the second reagent is in a form of a powder, the powder comprising particles having dimensions of less than 250 μm.

6. The method of claim 1, wherein the third reagent is selected from alkaline metals and alkaline earth metals.

7. The method of claim 6, wherein the third reagent is an alkaline earth metal in a form of a powder, shavings or turnings.

8. The method of claim 7, wherein the third reagent is magnesium or calcium.

9. The method of claim 1, wherein step a) comprises depositing in a reaction enclosure at least one layer of pellets consisting of a homogeneous mixture of the first and second reagents and at least two layers of the third reagent, the layer of pellets being inserted between both layers of the third reagent.

10. The method of claim 1, wherein step b) is carried out at a temperature equal to or greater than 900° C. but lesser than a melting temperature of the alloy based on uranium and comprising molybdenum.

11. The method of claim 10, wherein step b) is carried out at a temperature ranging from 950° C. to 1,150° C.

12. The method of claim 10, wherein step b) comprises a rise in temperature from 50° C. to 200° C./hour.

13. The method of claim 1, wherein step d) comprises milling in a fluidized bed the particles obtained at the end of step c).

14. The method of claim 13, further comprising a chemical reaction in the fluidized bed.

15. The method of claim 14, wherein the chemical reaction is a carbonation reaction.

16. The method of claim 15, wherein the carbonation reaction is carried out at a temperature from 150° C. to 475° C. and with a fluidization gas selected from carbon dioxide and a mixture of carbon dioxide and of an inert gas and/or steam.

17. The method of claim 16, wherein the steam represents at most 10% by volume of the fluidization gas.

18. The method of claim 16, wherein the fluidization gas is used at a pressure greater than 1 bar absolute and at a rate ranging from 3 cm/s to 20 cm/s.

19. The method of claim 13, wherein the fluidized bed is implemented in a reactor comprising devices generating vibrations in the fluidized bed.

20. The method of claim 19, wherein the devices generating vibrations are vibrating rods or wave guides.

21. The method of claim 13, wherein step d) comprises using a fluidization gas according to a succession of cycles, each cycle comprising a first period during which the fluidization gas is at a temperature from 250° C. to 400° C. and a second period shorter than the first period and during which the fluidization gas is at a temperature at least 100° C. lower than the temperature of the first period.

22. The method of claim 13, wherein in the fluidized bed is a jet fluidized bed.

23. The method of claim 1, wherein the powder of the alloy based on uranium and comprising molybdenum is a powder of a binary alloy UMo.

24. The method of claim 23, wherein the binary alloy UMo comprises from 5 to 15% by mass of molybdenum.

25. The method of claim 1, wherein the powder of the alloy based on uranium and comprising molybdenum is a powder of a ternary alloy UMoX in which X represents a metal other than uranium and molybdenum.

26. The method of claim 25, wherein X is selected from titanium, zirconium, chromium, silicon, niobium, platinum, tin, bismuth, ruthenium and palladium.

27. The method of claim 25, wherein the ternary alloy UMoX comprises at most 6% by mass of X.

28. A method for manufacturing a nuclear fuel, comprising:
　preparing a powder of an alloy based on uranium and comprising molybdenum, in a metastable γ phase, said preparing comprising
　　a) putting at least one first reagent selected from uranium oxides and mixtures thereof, uranium fluorides and mixtures thereof, into contact with a second reagent consisting of molybdenum and a third reagent consisting of a reducing metal, the first, second and third reagents being in a divided form;
　　b) reacting the first, second and third reagents at a temperature at least equal to a melting temperature of the third reagent and under an inert atmosphere, whereby particles are obtained, the particles comprising a core made of the alloy based on uranium and comprising molybdenum and a layer of a reducing metal oxide or fluoride covering the core;
　　c) cooling the so obtained particles at a rate at least equal to 450° C./hour; and
　　d) removing the reducing metal oxide or fluoride layer from the so cooled particles, thereby obtaining the powder of the alloy based on uranium and comprising molybdenum;
　mixing the powder with a powder of aluminum or of an alloy based on aluminum to form a fuel core; and
　subjecting the fuel core to rolling.

\* \* \* \* \*